(12) United States Patent
Demachi et al.

(10) Patent No.: US 8,130,636 B2
(45) Date of Patent: Mar. 6, 2012

(54) COMMUNICATION CONTROL SYSTEM

(75) Inventors: Koji Demachi, Tokyo (JP); Hiromichi Ebashi, Tokyo (JP); Kuniharu Akabane, Tokyo (JP); Takeshi Nakajima, Tokyo (JP); Kenji Habaguchi, Tokyo (JP); Masayuki Murakami, Tokyo (JP); Toyoaki Yokoi, Tokyo (JP); Takeshi Hongo, Tokyo (JP); Akinori Ishii, Tokyo (JP); Sadatoshi Sogo, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 1342 days.

(21) Appl. No.: 10/583,079

(22) PCT Filed: Aug. 11, 2004

(86) PCT No.: PCT/JP2004/011537
§ 371 (c)(1),
(2), (4) Date: May 3, 2008

(87) PCT Pub. No.: WO2005/060168
PCT Pub. Date: Jun. 30, 2005

(65) Prior Publication Data
US 2007/0250182 A1 Oct. 25, 2007

(30) Foreign Application Priority Data
Dec. 15, 2003 (JP) ................ P.2003-415989

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/28* (2006.01)
*H04L 12/56* (2006.01)

(52) U.S. Cl. .................. 370/218; 370/242
(58) Field of Classification Search .............. None
See application file for complete search history.

(56) References Cited

U.S. PATENT DOCUMENTS
6,163,543 A * 12/2000 Chin et al. ............ 370/400
2005/0002365 A1 * 1/2005 Xu ..................... 370/338

FOREIGN PATENT DOCUMENTS
EP  1289208 A2  3/2003
JP  7-7516        1/1995
JP  10-322377    12/1998

(Continued)

OTHER PUBLICATIONS

A. Robertson, Linux-HA Heartbeat System Design, pp. 2-12, Oct. 14, 2002.*

(Continued)

*Primary Examiner* — Ian N Moore
*Assistant Examiner* — Christopher Crutchfield
(74) *Attorney, Agent, or Firm* — Westerman, Hattori, Daniels & Adrian, LLP

(57) ABSTRACT

A communication control system is provided that performs communications satisfying a request for industrial applications and a request for open protocol communications at the same time. To this end, in the invention, a high-priority communication section performing critical communications to provide real time property and reliability, and a low-priority communication section performing communications based on an open standard protocol coexist in a same communication station.

5 Claims, 14 Drawing Sheets

FOREIGN PATENT DOCUMENTS

| | | |
|---|---|---|
| JP | 11-205356 | 7/1999 |
| JP | 2000-4275 | 1/2000 |
| JP | 2003-69588 | 3/2003 |

OTHER PUBLICATIONS

H. Miltz, Linux High Availability How-To, Chapters 6 and 8, pp. 1-17, Dec. 22, 1998.*

B. Quinn and K. Almeroth, IP Multicast Applications: Challenges and Solutions, pp. 1-28, Sep. 2001.*

A. Jungmaier and M. Tuzed, On the use of SCTP in Failover Scenarios, pp. 363-368, Jul. 14-18, 2002.*

Author Unknown, IEEE 802.3ad Standard-2000, IEEE Press, Mar. 2000, pp. 1-183.*

M. Christensen and F. Solensky, Considerations for IGMP and MLD Snooping Switches, pp. 1-25, Oct. 2003.*

J. Chen Z. Wang, Y. Sun, Real Time Capability Analysis for Switch Industrial Ethernet Traffic Priority-Based, pp. 525-529, 2002.*

Supplementary Partial European Search Report dated Jul. 25, 2011, issued in corresponding European Patent Application No. 04771522.2.

* cited by examiner

COMMUNICATION CONTROL SYSTEM

TECHNICAL FIELD

The present invention relates to a communication control system used for a distributed control system or the like.

BACKGROUND ART

The distributed control system is used for plant operation control in a wide variety of fields such as petrochemistry, steel, paper pulp, foods, pharmaceuticals, and electric power.

FIG. 1 shows an exemplary configuration of a general distributed control system.

Referring to FIG. 1, an operation monitoring apparatus 1 and a controller 2 are connected to a control bus 3. The controller 2 controls a plant 4 under the monitoring of the operation monitoring apparatus 1. The operation monitoring apparatus 1 is in charge of operation and monitoring of the plant. The operation monitoring apparatus 1 displays a screen to perform control operation and monitoring. In accordance with the scale of the plant, a plurality of controllers are distributed across the plant. The operation monitoring apparatus 1 and the controller 2 communicate with each other to control the plant via the control bus 3.

Sensor devices 5, 6 present in the plant 4 detects the process values of temperature, pressure and liquid level. Valves 7, 8 have their throttle opening controlled by an operation signal given by the controller 2. An analog signal of 4 to 20 mA and 1 to 5V output from the sensor devices 5, 6 is input to the controller 2. Based on this input, a control unit (not shown) in the controller 2 performs control arithmetic operation and obtains an operation amount. The operation amount is output as an analog signal of 4 to 20 mA and 1 to 5V, which controls the throttle opening of the valves 7, 8. For example, by controlling the valve throttle opening of a reaction oven the process amount of temperature or pressure is controlled.

The control bus of a conventional distributed control system is a bus dedicated to process control. The protocol for the control bus is a protocol dedicated to process control. In recent years, remarkable progress in IT (Information Technology) or web-related technologies has presented a need for the open architecture of the control bus for a distributed control system. As a request for the open architecture, a request for a network that is based on Ethernet (registered trademark) is on the rise.

With this background, it is under study to apply Industrial Ethernet(registered trademark) to the control bus for a distributed control system.

The Patent Reference 1 describes a communication control system that employs a redundant configuration of a network adapter transparent to a user application program when a communication station communicating over the TCP/IP (Transmission Control Protocol/Internet Protocol) is connected to Ethernet(registered trademark).

Patent Reference 1: JP-A-11-205356

Industrial Ethernet(registered trademark) does not currently satisfy the real time property or reliability requested in process control so that it is difficult to provide such a communication control system.

In a conventional system, it is difficult to implement open protocol communications while assuring real time property and reliability from the following circumstances:
(a) Communications over a standard protocol that is based on Ethernet(registered trademark) or TCP/IP (Transmission Control Protocol/Internet Protocol) do not sufficiently satisfy the needs for real time property and reliability when used in industrial applications such a process control.
(b) Communications over a unique dedicated protocol for attaining real time property and reliability have only insufficient compatibility when connected to another system or when a network device or software widely available on the market is used. This does not sufficiently meet the request for open protocol communications.

The invention has been accomplished in order to solve the problems. An object of the invention is to provide a communication control system capable of performing communications that satisfy real time property, high reliability and a need for open protocol communications by introducing in the same communication station critical communication section for providing real time property and high reliability as open communication section.

DISCLOSURE OF THE INVENTION

In order to solve the problems, the invention is configured as follows:

(1) A communication control system for controlling communications performed between a plurality of communication stations that are connected to communication paths being multiplexed with a main path and a sub-path, the communication control system comprising:

first communication function implementing sections which are multiplexed so as to correspond with the main path and the sub-path respectively, and each of which implements a communication function in a physical layer of an OSI hierarchical model;

second communication function implementing sections which are multiplexed so as to correspond with the multiplexed first communication function implementing sections respectively, and each of which implements a communication function in a data link layer of the OSI hierarchical model;

a high-priority communication section for performing a high-priority communication via the first communication function implementing section and the second communication function implementing section each corresponding to any one of the multiplexed communication paths; and a low-priority communication section for performing a low-priority communication via the first communication function implementing section and the second communication function implementing section each corresponding to the sub-path, wherein the high-priority communication section and the low-priority communication section coexist in a single communication station, and the second communication function implementing section includes:

an address storing section for storing MAC addresses corresponding to the high-priority communication section and the low-priority communication section respectively;

a transmitting section which attaches the corresponding MAC address to a communication frame depending on whether a transmission requestor is the high-priority communication section or the low-priority communication section, and transmits the communication frame to the communication path; and a receiving section which compares a destination MAC address of a communication frame received from the first communication function implementing section with the MAC address stored in the address storing section, and when a match is found in the comparison result, sends the received communication frame to the corresponding communication section.

(2) The communication control system according to (1), further comprising:

a multicast address storing section for storing a plurality of MAC multicast addresses, wherein when a destination MAC address of a communication frame received from the communication path matches with any one of the addresses stored in the MAC multicast address storing section, the second communication function implementing section sends the communication frame to the high-priority communication section, and otherwise the second communication function implementing section sends the communication frame to the low-priority communication section.

(3) The communication control system according to (1) or (2), wherein units each including the high-priority communication section, the low-priority communication section and the communication function implementing sections, or units each including the high-priority communication section, the low-priority communication section, the first communication function implementing sections and the second communication function implementing sections are provided and multiplexed in a single communication station, and one unit serves as an active unit and the other unit serves as a standby unit.

(4) A communication control system for controlling communications performed between a plurality of communication stations that are connected to communication paths being multiplexed with a main path and a sub-path, the communication control system comprising:

a high-priority communication section for performing a high-priority communication normally via the main path;

a low-priority communication section for performing a low-priority communication via the sub-path;

a path diagnosing section for diagnosing a soundness of the main path and the sub-path; and a switching section for switching the communication path of the high-priority communication to the sub-path when the main path is diagnosed as faulty as a result of diagnosis by the path diagnosing section, wherein the path diagnosing section includes:

a path state storing section for storing path state information of a path state from a home station to each communication station; and a fixed-cycle path diagnosing section for diagnosing the communication path from the home station to each communication station in a fixed cycle, wherein the fixed-cycle path diagnosing section registers the path state information obtained from the diagnosis result, in the path state storing section, the fixed-cycle path diagnosing section broadcasts a path diagnosis packet in accordance with a multicast protocol of Internet Protocol, different IP multicast addresses are assigned to the main path and the sub-path respectively, and each communication station performs broadcasting by using the IP multicast address corresponding to a path selected between the main path and the sub-path, as a destination IP address, and receives a path diagnosis packet of which destination IP address matches with the IP multicast address corresponding to each of the main path and the sub-path.

(5) The communication control system according to (4), wherein the fixed-cycle path diagnosing section includes a diagnosis packet transmitting section for broadcasting to other communication stations a path diagnosis packet including receive state information of path diagnosis packets from other communication stations, and on receiving a path diagnosis packet, the fixed-cycle path diagnosing section registers in the path state storing section receive state information of the path diagnosis packet transmitted by the home station, the receive state information being included in the received path diagnosis packet, as the path state information of the communication path from the home station to a transmitting source of the path diagnosis packet.

(11) The communication control system according to (10), further comprising:

a path state storing section for storing path state information of a path state from a home station to each communication station;

a counting section for counting times of the data transmitting section retransmitting the data; and a registering section which, when a count value of the counting section reaches a specified value, determines the communication path as faulty and registers the path state information indicating that the path is faulty, in the path state storing section.

(6) The communication control system according to (4) or (5), further comprising:

a multiplexed communication station where units each including the high-priority communication section, the low-priority communication section, the path diagnosing section and the switching section are provided while being multiplexed, any one of the units serves as an active unit and the other unit serves as a standby unit, and a different address is assigned to the high-priority communication section of each unit, wherein another communication station which performs a transmission to the multiplexed communication station performs communication by designating the active unit, and when failing to communicate with the active unit via any one of the multiplexed communication paths, retries to communicate by switching a designation to the standby unit.

(7) The communication control system according to (6), wherein the multiplexed communication station each includes a self diagnosing section, the self diagnosing section in the active unit halts a communication operation while placing the home unit in a standby state on detecting a failure, the standby unit places the home unit in the active state so as to start a communication operation when the other unit halts the communication operation, and broadcasts to the other communication stations that the home unit has become the active unit, and each communication station includes a table storing information indicating which unit of the multiplexed communication station is active, performs transmission to the active unit while referencing the information stored in the table, and updates the information in the table when receiving the broadcast communication.

(8) The communication control system according to (4), wherein while the path diagnosing section detects a failure in the main path, the path diagnosing section broadcasts the failure in the main path to all communication stations in a fixed cycle.

(9) The communication control system according to (15), wherein when the low-priority communication section receives a broadcast notice indicating that the main path is faulty, the low-priority communication section controls a transmission so that a transmission count per unit time of low-priority communication is equal to or smaller than a predetermined value, and when the broadcast notice is not received for equal to or more than a predetermined time, the low-priority communication section determines that the main path is restored to normal operation and halts the transmission control of making the transmission count be equal to or smaller than the predetermined value.

(10) The communication control system according to (4), wherein while the low-priority communication section recognizes the main path as faulty, the low-priority communication section controls a transmission so that a transmission count per unit time of the low-priority communication is equal to or smaller than a predetermined value.

(11) The communication control system according to (4), wherein in a case where the low-priority communication section is recognizing the main path as faulty, while the sub-path is not under transmission, the low-priority communication section immediately performs the high-priority communication, and while the sub-path is not under transmission and there is no high-priority communication waiting to be transmitted, the low-priority communication section performs the low-priority communication.

(12) The communication control system according to (4), further comprising:
an authentication section which performs authentication between the high-priority communication sections in different communication stations so as to enable communication between the authenticated communication stations.

(13) The communication control system according to (2), wherein the authentication section includes:
a public key generating section for generating an electronic public key to be exchanged between the home station and another communication stations from an electronic private key that is unique to the home station;
a key transmitting section for broadcasting the generated public key to all communication stations;
a common key generating section which generates an electronic common key that is unique to the home station and another communication station from a public key received from the another station and the private key of the home station, generates the electronic common key for each communication station, and stores the generated common key;
an authentication packet transmitting section which performs at least either encryption of a packet or attachment of an authentication value to a packet by using the generated common key, and transmits at least either the encrypted packet or the packet to which the authentication value is attached; and
an authentication packet receiving section which performs at least either decrypting of the received packet by using the common key or determination on whether reception is allowed based on the common key and the authentication value being attached to the packet.

(14) The communication control system according to (13), wherein the common key generating section generates the common key from the private key and the public key by using Differ-Hellman method.

(15) The communication control system according to (13), wherein the authentication section includes:
a key update section for updating the common key by changing the private key per predetermined time;
a confirming section which stores the common key just before update and a latest common key, confirms the authentication value by using the latest common key on receiving the packet, and in a case where the confirmation is determined as illegal, confirms the authentication value by using the common key just before update; and
a decoding section for performing decoding of the packet by using either the common key just before update or the latest common key by which the authentication value is confirmed as valid.

(16) The communication control system according to (1) or (4), wherein a router for performing a path control of the communication path in accordance with Internet Protocol is provided on the communication path, and the communication path includes a plurality of sub-networks being interconnected by the router.

(17) The communication control system according to (16), wherein a sole master station exists on the sub-network,
the master station transmits an inter-network diagnosing frame including path state information on the paths between the home station and all another communication stations existing on the sub-network to which the home station belongs and path state information on the path between the home station and a master station existing on a sub-network to which the home station does not belong, and
each of all communication stations on the plurality of sub-networks including the master station and the other communication stations includes:
a path state storing section for storing path state information indicating whether the communication path from the home station to each of another communication stations is sound;
a diagnosing message receiving section which registers in the path state storing section the path state between the home station and the communication station existing on the sub-network to which the home station does not belong, based on the path state information included in the inter-network diagnosing frame; and
a data transmitting section which selects either the main path or the sub-path in accordance with the information in the path state storing section, and performs transmission of data.

(18) The communication control system according to (17), further comprising:
a selecting section which generates a list of network addresses of all communication stations existing on the sub-network, and in a case where an address of the home station is the address that is uniquely determined among the list based on a predetermined condition, causes the home station to operate as the master station on the sub-network.

(19) The communication control system according (1) or (4), wherein the high-priority communication section performs communication in accordance with a protocol dedicated to process control, and
the low-priority communication section performs communication in accordance with an open standard protocol.

(20) The communication control system according to (1) or (4), wherein the high-priority communication section transfers at least one of process data, an operation amount and an alarm, and
the low-priority communication section performs at least one of image data transfer, file transfer and message transfer.

(21) A communication control system for controlling communications performed between a plurality of communication stations that are connected to communication paths being multiplexed with a main path and a sub-path, the communication control system comprising:
a high-priority communication section for performing a high-priority communication normally via the main path;
a low-priority communication section for performing a low-priority communication via the sub-path;
a path diagnosing section for diagnosing a soundness of the main path and the sub-path; and
a switching section for switching the communication path of the high-priority communication to the sub-path when the main path is diagnosed as faulty as a result of diagnosis by the path diagnosing section.

(22) The communication control system according to (21), wherein the path diagnosing section includes:

a path state storing section for storing path state information of a path state from a home station to each communication station; and a fixed-cycle path diagnosing section for diagnosing the communication path from the home station to each communication station in a fixed cycle, wherein the fixed-cycle path diagnosing section registers the path state information obtained from the diagnosis result, in the path state storing section.

(23) The communication control system according to (22), wherein the fixed-cycle path diagnosing section includes a diagnosis packet transmitting section for broadcasting to other communication stations a path diagnosis packet including receive state information of path diagnosis packets from other communication stations, and on receiving a path diagnosis packet, the fixed-cycle path diagnosing section registers in the path state storing section receive state information of the path diagnosis packet transmitted by the home station, the receive state information being included in the received path diagnosis packet, as the path state information of the communication path from the home station to a transmitting source of the path diagnosis packet.

(24) The communication control system according to any one of (21) to (23), further comprising:

a data transmitting section which transmits data to another communication station, and retransmits the data when a normal reception response is not returned from the another communication station within a predetermined time; and a data receiving section for returning a normal reception response to a transmitting source when data is normally received.

(25) The communication control system according to (24), further comprising:

a path state storing section for storing path state information of a path state from a home station to each communication station;

a counting section for counting times of the data transmitting section retransmitting the data; and a registering section which, when a count value of the counting section reaches a specified value, determines the communication path as faulty and registers the path state information indicating that the path is faulty, in the path state storing section.

(26) The communication control system according to (24), further comprising:

a counting section for counting times of the data transmitting section retransmitting the data; and a switching section which, when a count value of the counting section reaches a specified value, determines the communication path as faulty and switches the communication path.

As understood from the discussion, the invention provided the following advantages:

(1) Critical communication section (high-priority communication section) to provide real time property and high reliability and open communication section (low-priority communication section) coexist in the same communication station. This provides a communication control system that satisfies a request for industrial applications and a request for open protocol communications at the same time.

(2) When a communication path used for critical communications is faulty, the communication path used for critical communications is switched to a communication path for open communications. This prevents the traffic of open communications that is based on a standard protocol from having an influence on the real time property of critical communications.

(3) Open communications are under way with some restrictions even while critical communications are using a communication path for open communications. This avoids interruption of open communications.

(4) A common key to serve as a common password between communication stations is generated and the common key is used for authentication. By providing critical communications with a common key, it is possible to prevent a security attack via standard protocol communications from having an influence on critical communications.

(5) A communication path is being multiplexed while critical communications and standard protocol communications coexist in the same communication station, thus assuring high reliability.

(6) There are provided a function to perform acknowledgment communications with an actual communication timing and a function to diagnose a path in a fixed cycle irrespective of a communication timing. This allows quick detection of a fault in a path, which minimizes the switchover time of communication path thus assuring the real time property of communications.

(7) A router is provided on a communication path for interconnecting sub-networks. This readily supports network connection over a wide area or a large-scale network.

(8) The same communication path and transmitting/receiving section are shared in the same communication station for communications that is based on an open standard protocol and critical communications. This reduces the component cost and wiring cost.

BEST MODE FOR CARRYING OUT THE INVENTION

The invention will be detailed referring to drawings.

(1) First Embodiment

Figure 2:
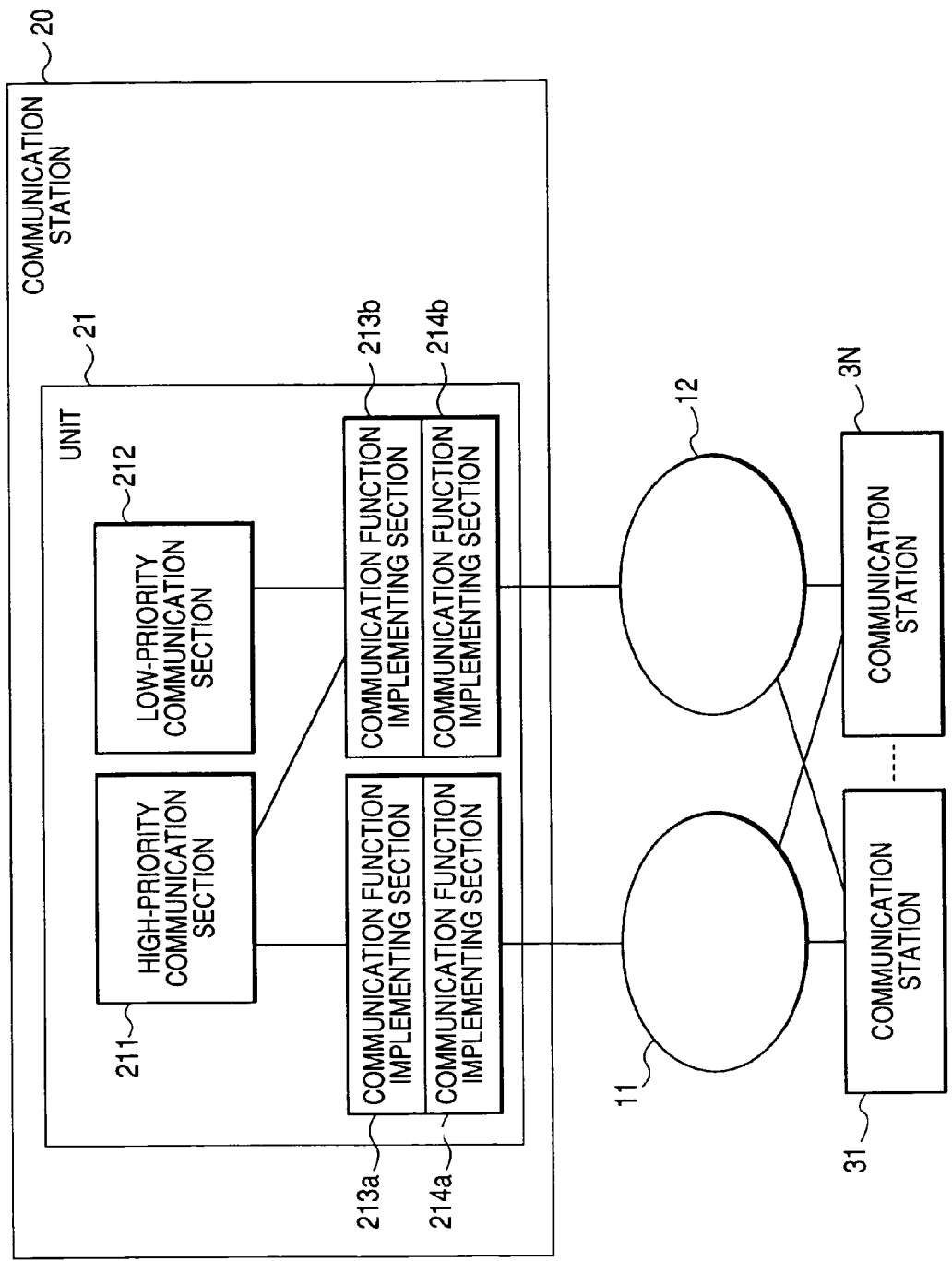
[FIG. 2] It is a block diagram showing an embodiment of the invention.

FIG. 2 is a block diagram showing an embodiment of the invention. In FIG. 2, a communication path 10 is duplicated by a main path 11 and a sub-path 12. The communication path 10 is for example the control bus of a distributed control system.

A communication station 20 and communication stations 31 to 3N are connected to the main path 11 and the sub-path 12.

The communication station 20 includes a unit 21 for performing communications. The embodiment in FIG. 1 includes a single unit.

In the unit 21, high-priority communication section 211 performs high-priority communications. Low-priority communication section 212 performs low-priority communications.

High-priority communications transfer process data, an operation amount, an alarm and the like. Low-priority communications performs image data transfer, file transfer, message transfer, and the like. High-priority communications transfer more real time data while low-priority communications are less real time than high-priority communications.

The high-priority communication section 211 performs communications in accordance with a protocol dedicated to process control. The low-priority communication section performs communications in accordance with an open standard protocol. The open standard protocol is for example IP (Internet Protocol).

Communication function implementing section 213a, 213b is duplicated. Communication function implementing section 214a, 214b is also duplicated. These communication function implementing section are provided to implement the communication function in a predetermined layer of an OSI (Open Systems Interconnection) hierarchical model.

The communication function implementing section 213a, 213b implements a communication function in the physical layer (first layer) of an OSI hierarchical model.

The communication function implementing section 214a, 214b implements a communication function in the data link layer (second layer) of an OSI hierarchical model.

The 213a and 214a are provided to correspond to the main path 11. The 213b and 214b are provided to correspond to the sub-path 12.

In the communication control system shown in FIG. 2, when communications are under way normally in which there is no failure in the communication, the high-priority communication section 211 uses the communication function implementing section 213a and 214a to perform communications on the main path 11. The low-priority communication section 212 uses the communication function implementing section 213b and 214b to perform communications on the sub-path 12.

When the main path 11 becomes faulty, the high-priority communication section 211 uses the communication function implementing section 213b, 214b and the sub-path 12 to perform communications. In this case, low-priority communications are restricted.

The high-priority communication section 211 can perform communications by using either the duplicated communication function implementing section 213a, 213b or the communication function implementing section 214a, 214b. The low-priority communication section 212 can use only its corresponding communication function implementing section 213b and 214b.

In this way, the high-priority communication section 211 and the low-priority communication section 212 coexist in the same communication station.

According to the embodiment shown in FIG. 2, the high-priority communication section to provide real time property and high reliability and low-priority communication section that uses an open standard protocol coexist in the same communication station. This provides a communication control system that satisfies a request for industrial applications and a request for open protocol communications at the same time.

Figure 3:
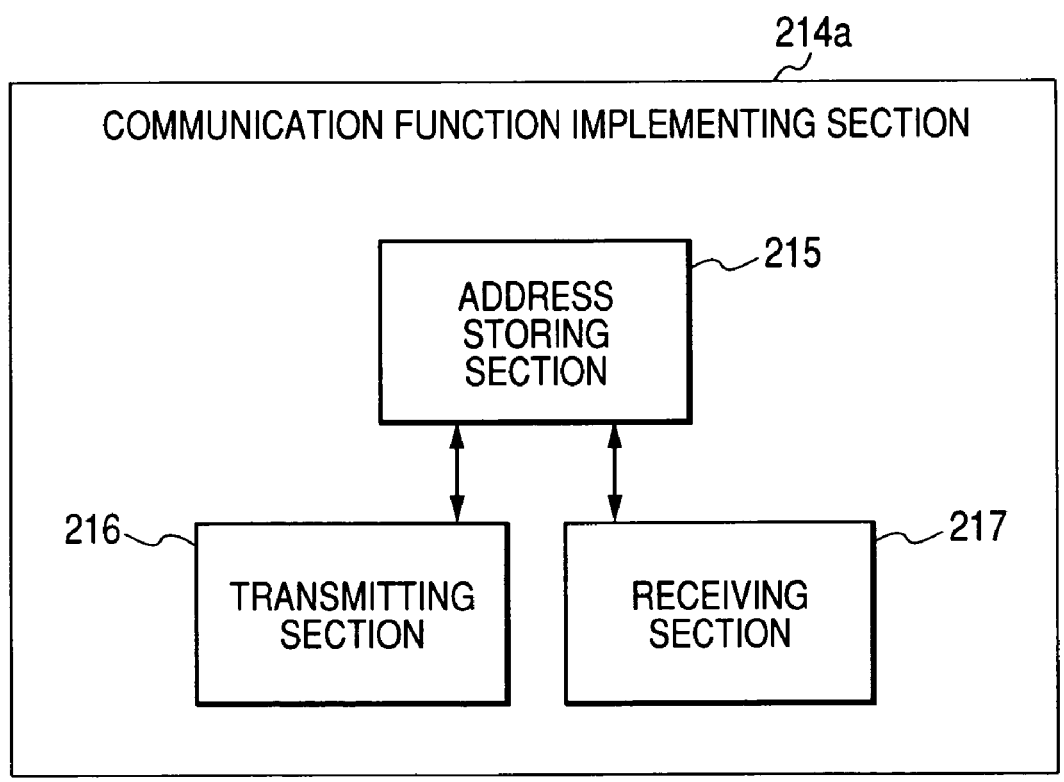
[FIG. 3] It is a block diagram showing communication function implementing section.

FIG. 3 shows an exemplary configuration of communication function implementing section for implementing a communication function in the data link layer.

The configuration will be described taking as an example the communication function implementing section 214a. The communication function implementing section 214b has the same configuration.

In FIG. 3, an address storing section 215 stores a MAC address corresponding to each of the high-priority communication section 211 and low-priority communication section 212. A single MAC (Media Access Control) address is assigned to each of the high-priority communication section 211 and low-priority communication section 212.

Transmitting section 216 appends a corresponding MAC address to a communication frame depending on whether the transmission requestor is the high-priority communication section 211 or low-priority communication section 212 and transmits the communication frame to a communication path.

Receiving section 217 compares the destination MAC address of the communication frame received from the communication function implementing section 213a with the MAC address stored by the address storing section 215, and in case a match is found in the comparison result, passes the received communication frame to the pertinent communication section (high-priority communication section 211 or low-priority communication section 212).

A multicast address storing section to store a plurality of MAC multicast addresses may be provided in place of the address storing section 215.

In this configuration, the receiving section 217 of the communication function implementing section 214a, in case the destination MAC address of the communication frame received from the main path 11 matches any one of the addresses present in the MAC multicast address storing section, passes the communication frame to the high-priority communication section 211 and otherwise passes the communication frame to the low-priority communication section 212.

In this way, high-priority communications uses a MAC multicast address for communications.

(2) Second Embodiment

Figure 4:
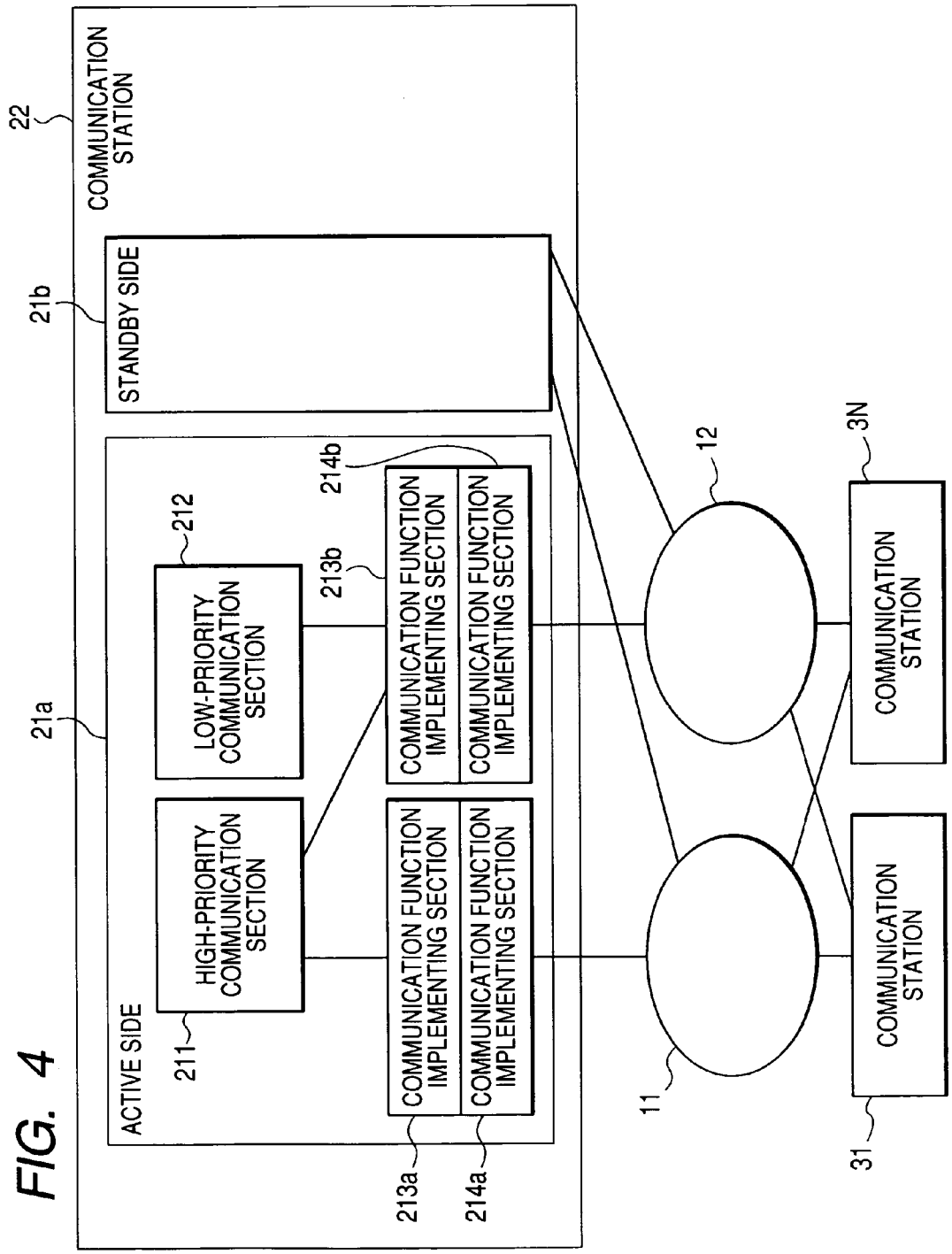
[FIG. 4] It is a block diagram showing another embodiment of the invention.

FIG. 4 is a block diagram of another embodiment of the invention. In FIG. 4, same components as the preceding ones are given the same signs. In this embodiment, the unit is duplicated.

A communication station 22 includes a dual unit 21a and 21b. The unit 21a includes high-priority communication section 211, low-priority communication section 212, communication function implementing section 213a, 213b, 214a, 214b. The unit 21b has the same configuration as the unit 21a. In the illustrated example, the unit 21a serves as an active unit and the unit 21b serves as a standby unit.

The active unit 21a performs communications. When the active unit 21a turns faulty, the unit 21a halts communications and places itself in the standby state. The standby unit 21b switches to the active unit and takes over the communications.

In this embodiment, the unit is duplicated thus enhancing the reliability of communications. The unit may be triplicated or further being multiplexed.

(3) Third Embodiment

Figure 5:
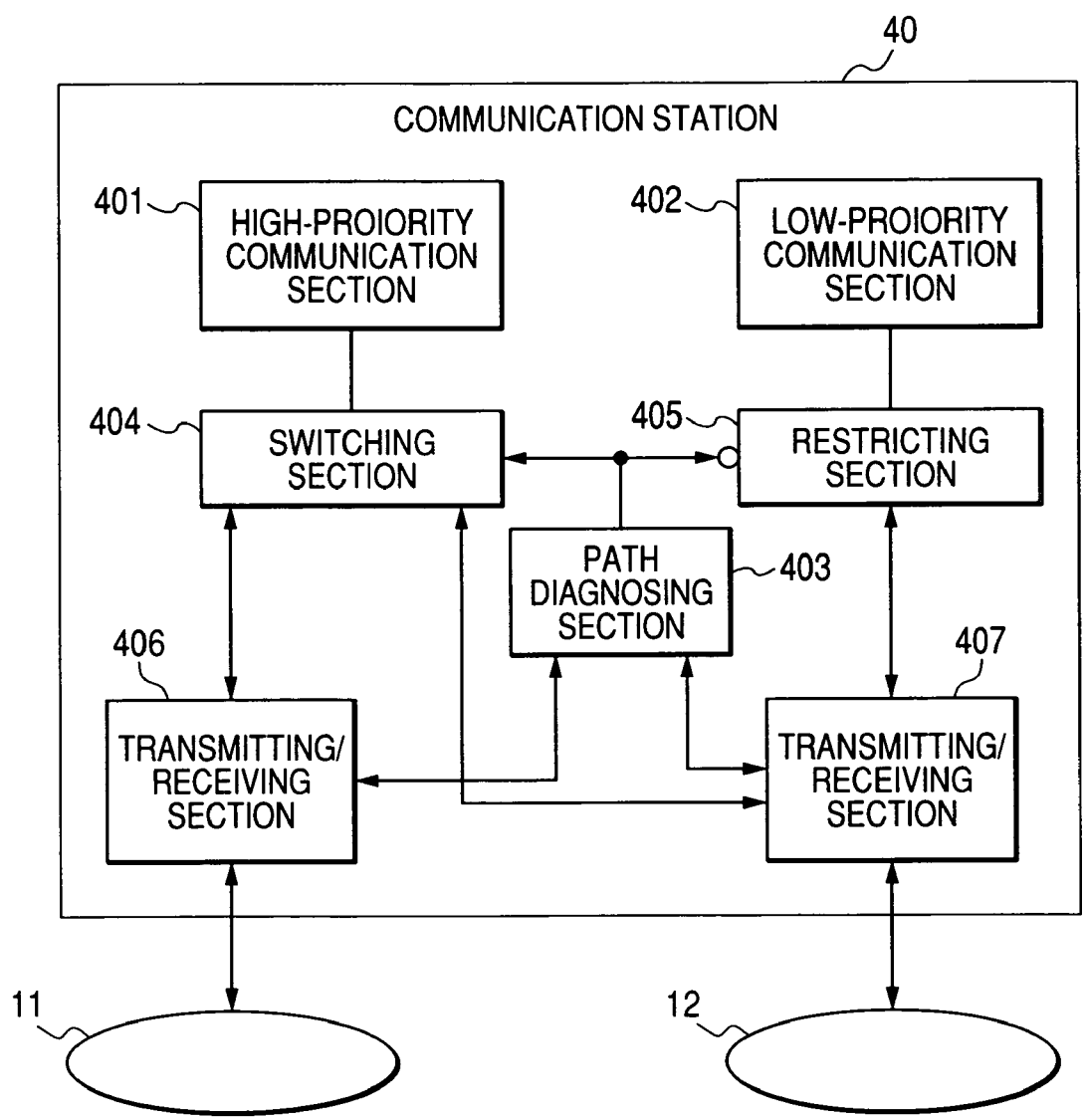
[FIG. 5] It is a block diagram showing another embodiment of the invention.

FIG. 5 is a block diagram of another embodiment of the invention.

In FIG. 5, a communication station 40 is connected to a main path 11 and a sub-path 12.

High-priority communication section 401 performs high-priority communications by using the main path 11.

Low-priority communication section 402 performs low-priority communications by using the sub-path 12.

Path diagnosing section 403 diagnoses the soundness of the main path 11 and the sub-path 12.

Switching section 404 switches the communication path between the high-priority communication section 401 and its distant party based on the diagnosis result of the path diagnosing section 403.

Restricting section 405 restricts communications by the low-priority communication section 402 based on the diagnosis result of the path diagnosing section 403. For example, the restricting section 405 restricts the transmission band of the low-priority communication section 402.

Transmitting/Receiving section 406, on receiving a transmission request from the high-priority communication section 401, sequentially transmits communication frames to the main path 11 and passes the communication frames received from the main path 11 to a destination.

Transmitting/Receiving section 407, on receiving a transmission request from the low-priority communication section 402, sequentially transmits communication frames to the sub-path 12 and passes the communication frames received from the sub-path 12 to a destination.

Figure 1:
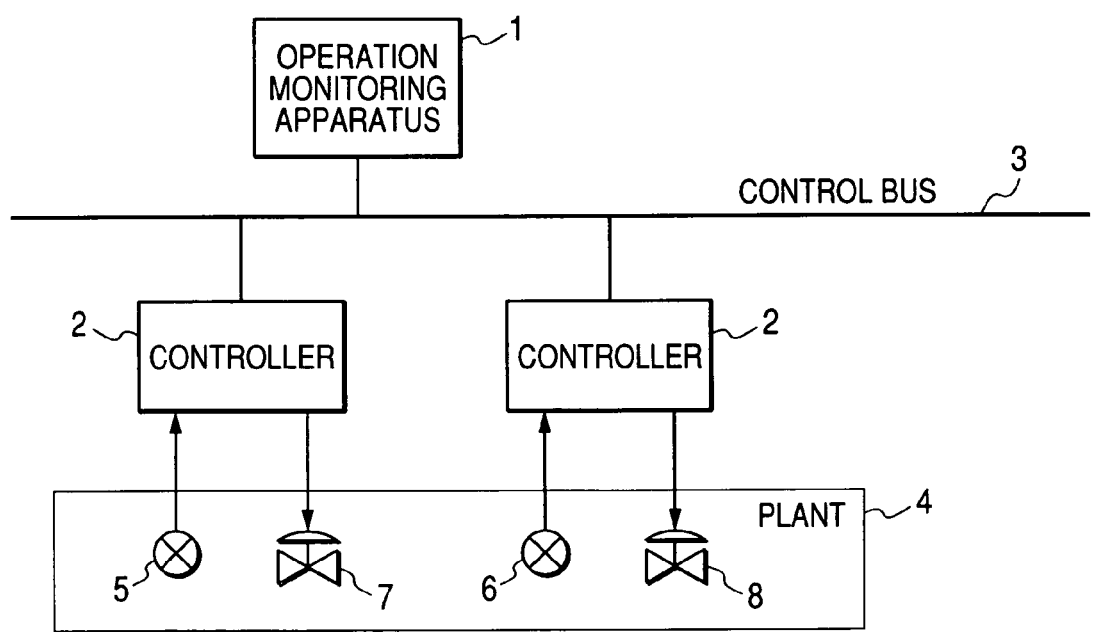
[FIG. 1] It shows an exemplary configuration of a general distributed control system.

The transmitting/receiving section 406 and 407 respectively correspond to the communication function implementing section 213a, 214a and 213b, 214b in the embodiment shown in FIG. 1.

In the embodiment shown in FIG. 5, in case the path diagnosing section 403 has determined that the main path 11 is normal, the switching section 404 selects the main path 11 as the communication path of the high-priority communication section 401. In case the path diagnosing section 403 has determined that the main path 11 is faulty, the switching section 404 switches the communication path of the high-priority communication section 401 to the sub-path 12. In case the path diagnosing section 403 has determined that the main path 11 is normal, the restricting section 405 does not restrict the transmission band of the low-priority communication section 402. In case the path diagnosing section 403 has determined that the main path 11 is faulty, the restricting section 405 restricts the transmission band of the low-priority communication section 402.

The path diagnosing section 403 also diagnoses the sub-path 12 and, on detecting a fault, generates an alarm.

The path diagnosing section 403, on determining that the main path 11 is faulty, broadcasts the fault in the main path to all communication stations. The low-priority communication section 402, on receiving the broadcast notice that the main path is faulty, controls transmissions so that the transmission count per unit time of low-priority communications will drop below a predetermined value. When the broadcast notice that the main path is faulty is not received for a predetermined time, the low-priority communication section 402 determines that the main path is restored to normal operation and halts the transmission control whereby the transmission count is kept below the predetermined value.

The low-priority communication section 402 may control transmissions so that the transmission count per unit time of low-priority communications will drop below a predetermined value while it is recognizing that the main path 11 is faulty, also in the absence of a broadcast notice that the main path is faulty.

The low-priority communication section 402 immediately performs high-priority communications when the sub-path 12 is not transmitting and performs low-priority communications when the sub-path 12 is not transmitting and there are no high-priority communications waiting to be transmitted, while it is recognizing that the main path 11 is faulty.

According to the embodiment shown in FIG. 5, the high-priority communication section 401 and the low-priority communication section 402 respectively use separate path while the communication path is normal, thus sharing communications in a non-restricted band.

When the main path turns faulty, the communication path of the high-priority communication section 401 is switched to the sub-path and the low-priority communication section 402 is subjected to restriction on the transmission band. This allows high-priority communications continues while maintaining the corresponding band, thus keeping the real time property.

When the main path is faulty, the communication path of the high-priority communication section 401 is switched to the sub-path although the low-priority communication section 402 is capable of performing communications in a restricted band.

(4) Fourth Embodiment

Figure 6:
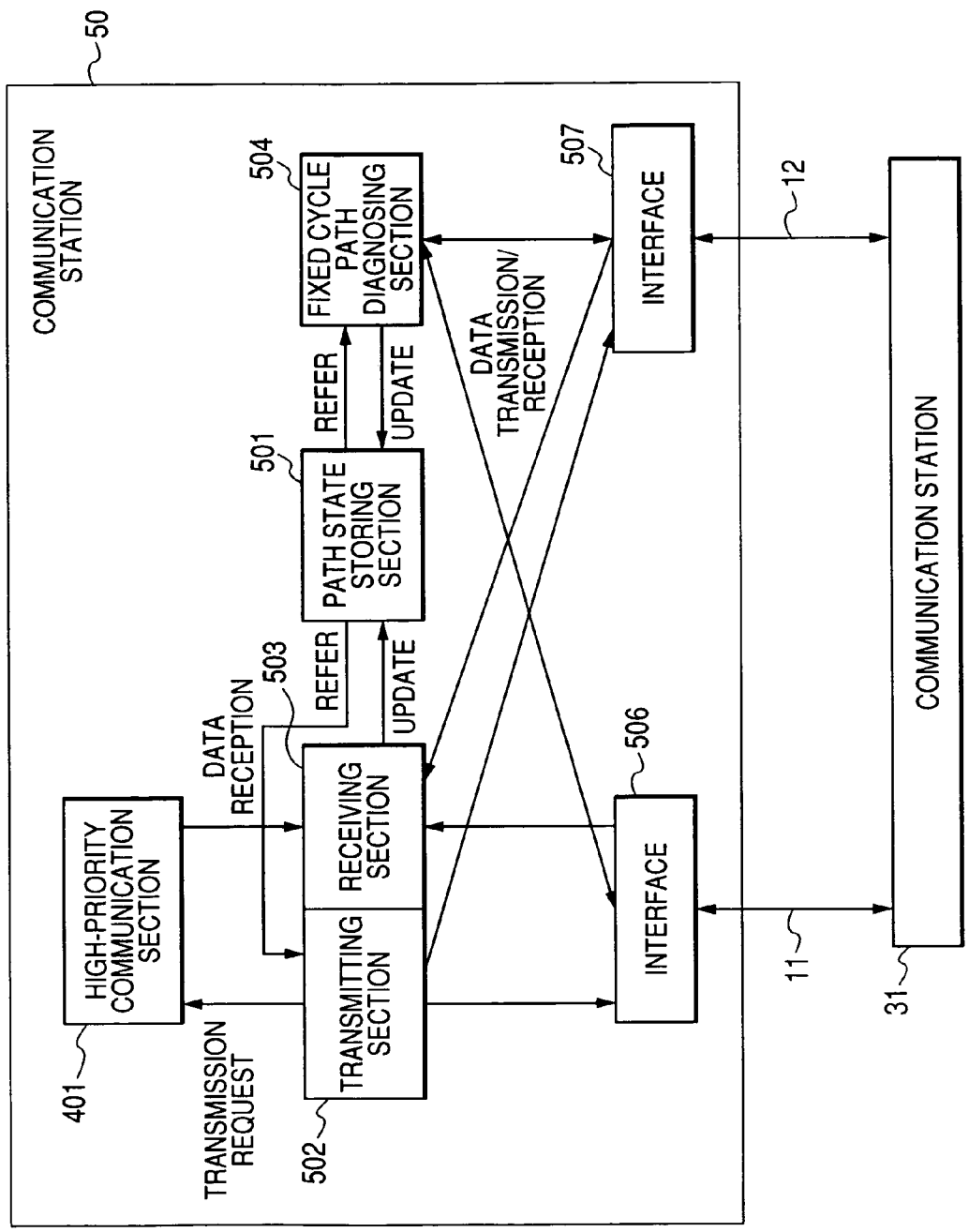
[FIG. 6] It is a block diagram showing another embodiment of the invention.

FIG. 6 is a block diagram of another embodiment of the invention. FIG. 6 shows a particular configuration example of path diagnosing section.

In FIG. 6, the path state storing section 501 stores path state information on whether the communication path from the home station is sound per interface and per distant station.

Transmitting section 502 receives a transmission request from the high-priority communication section 401, references the path state information in the path state storing section 501, selects a sound communication path and transmits data thereon.

The transmitting section 502, in case a normal reception response is not received within a predetermined period of time after data transmission, assumes the communication path as faulty and reflects this information on the path state information in the path state storing section 501.

The receiving section 503 receives data from the distant station and passes the received data to the high-priority communication section 401. When receiving data from the distant communication station, the receiving section 503 returns a normal reception response to the distant communication station.

In this way, the transmitting section 502 and the receiving section 503 perform acknowledgment communications whereby diagnosis is made based on whether a normal reception response is received in return for data transmission.

Fixed cycle path diagnosing section 504 diagnoses the state of the path from the home station cyclically per interface and per distant station, and registers the diagnosis result in the path state storing section 501.

The fixed cycle path diagnosing section 504 includes diagnosis packet transmitting section 505 (not shown). The diagnosis packet transmitting section 505 broadcasts a path diagnosis packet including the information on the receiving state of a path diagnosis packet from another communication station to the other stations.

The fixed cycle path diagnosing section 504, on receiving a path diagnosis packet, registers in the path state storing section 501 the information on the receiving state of a path diagnosis packet transmitted by the home station included in the received path diagnosis packet as the path state information on the communication path from the home station to the transmission source of the path diagnosis packet.

An interface 506 makes intervention in the communications between a main path 11 and a communication station 50. The interface 507 makes intervention in the communications between a sub-path 12 and the communication station 50.

According to the embodiment shown in FIG. 6, a function to perform acknowledgment communications with an actual communication timing and a function to diagnose a path in a fixed cycle irrespective of a communication timing are provided. This allows quick detection of a fault in a path.

The fixed cycle path diagnosing section 504 may broadcast a path diagnosis packet in accordance with the multicast protocol of the IP (Internet Protocol). In this case, a separate IP multicast address is assigned to each of the main path 11 and the sub-path 12. Each communication station performs broadcasting by using as a destination IP address the IP multicast address corresponding to a path selected between the main path and sub-path and receives a path diagnosis packet where the destination IP address matches the IP multicast address corresponding to the main path or sub-path.

With this operation, simultaneous communications to a particular communication station are made possible thus reducing the number of communication circuits. By using the IP multicast protocol, when networks are interconnected via a router, a sending station may communicate to a communication station on a network where the home station exists as well as a communication station on a network connected via the router. This minimizes the switchover time of communication path thus assuring the real time property of communications.

(5) Fifth Embodiment

Figure 7:
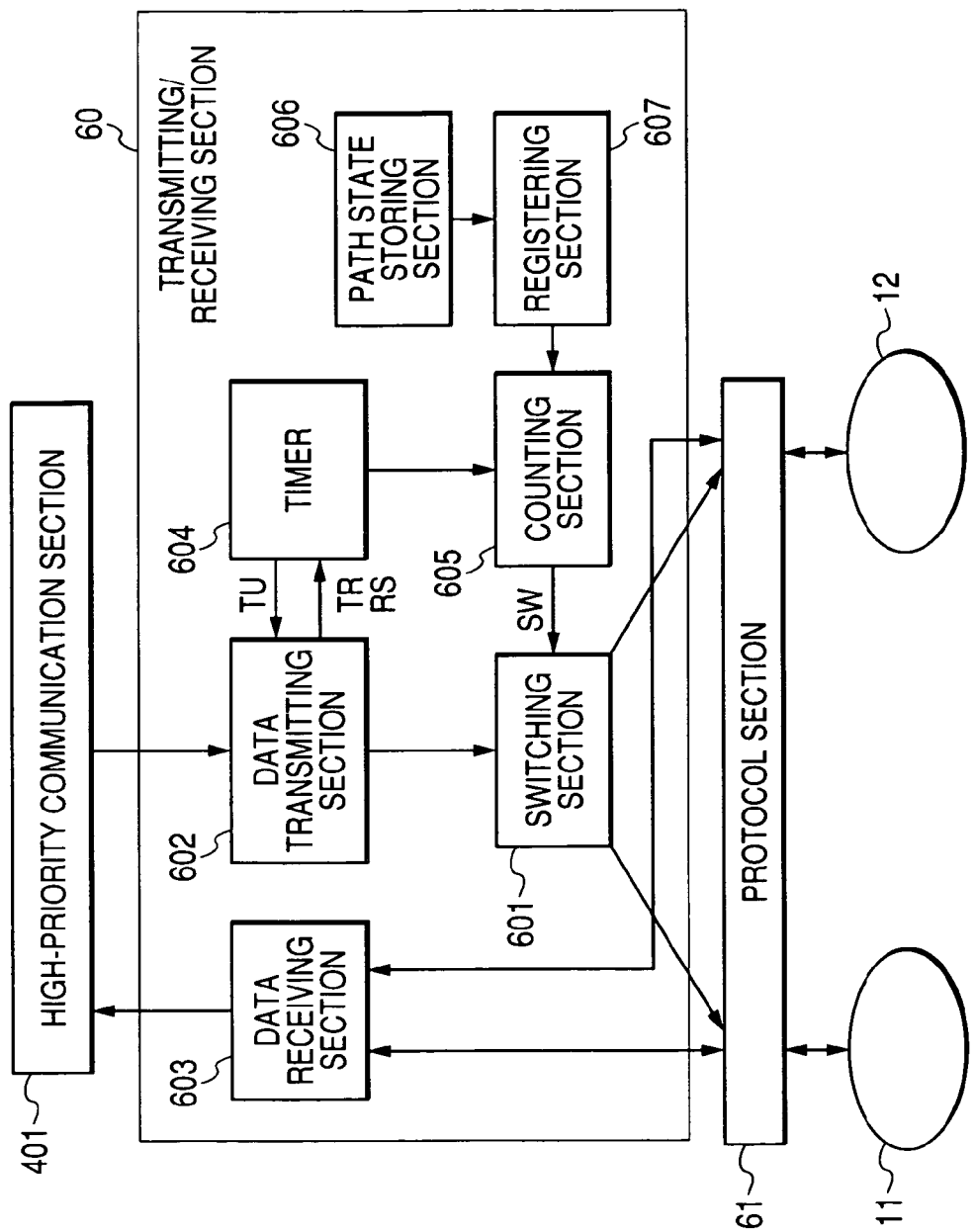
[FIG. 7] It is a block diagram showing another embodiment of the invention.

FIG. 7 is a block diagram showing another embodiment of the invention.

In FIG. 7, protocol section 61 performs communication control of a main path 11 and a sub-path 12 duplicated in accordance with a general-purpose connectionless protocol. The general-purpose connectionless protocol is for example UDP/IP (User Datagram Protocol/Internet Protocol).

UDP/IP is a higher level protocol of IP in a protocol group of TCP/IP. UDP/IP belongs to the transport layer and is defined in RFC768. UDP is a connectionless protocol and does not have such functions as connection management, acknowledgment, sequence, window control and flow control TCP possesses.

In other words, UDP/IP is substantially a protocol whereby an IP packet may be used by an application of the distant station. Including a smaller number of functions, UDP/IP is subject to a lower load thus allowing high-speed data communications. There is no guarantee that data is delivered to the distant party so that it is necessary to provide means for assuring reliability.

In the invention, reliability is assured by performing acknowledgment communications over UDP/IP.

In a transmitting/receiving section 60, switching section 601 switches a data transmitting port between the dual communication path (main path 11 and sub-path 12).

Data transmitting section 602 transmits the send data of the high-priority communication section 401 to the switching section 601.

Data receiving section 603 receives data from the main path 11 or sub-path 12 and transmits it to the high-priority communication section 401.

A timer 604 is activated by a signal TR generated by data transmission by the data transmitting section 602 and reset by a signal RS generated when the data receiving section 603 has received a normal reception response. The timer 604, on counting up to a specified value, transmits a time-up signal TU to the data transmitting section 602 to make a retransmission request. Receiving the time-up signal TU, the data transmitting section 602 retransmits the data.

Counting section 605 counts the number of time-up signals TU and, when a predetermined value is reached, originates a switching signal SW to the switching section 601 to switch over the communication path.

Path state storing section 606 stores information on the state of the path from the home station to each communication station.

Registering section 607 determines that the communication path is faulty when the count value of the counting section 605 has reached a specified value and registers in the path state storing section 606 the path state information indicating that the path is faulty.

According to the embodiment shown in FIG. 7, it is possible to assure reliability while enjoying the high-speed data transmission unique to a connectionless protocol. The general versatility of the connectionless protocol provides an open control bus at the same time.

A communication path is switched over when the data retransmission count has reached a predetermined value. It is thus possible to prevent switchover of path due to a temporary fault in a communication path. It is also possible to switch over a path while identifying a transient fault and a permanent fault.

(6) Sixth Embodiment

Figure 8:
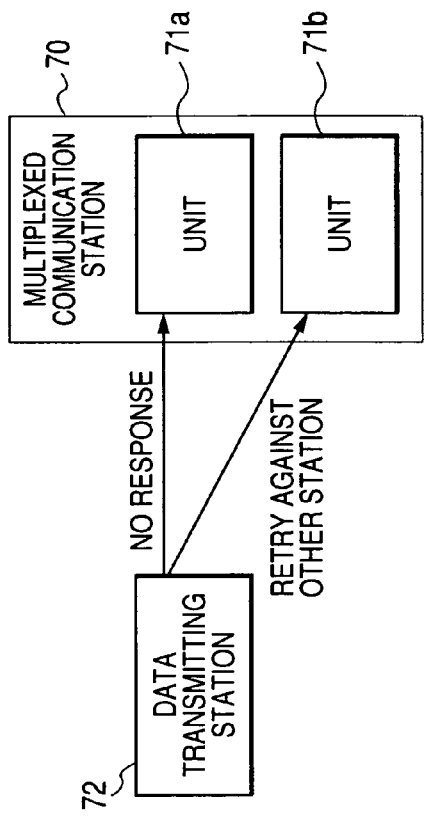
[FIG. 8] It is a block diagram showing another embodiment of the invention.

FIG. 8 is a block diagram of another embodiment of the invention.

In FIG. 8, a multiplexed communication station 70 includes a multiplexed unit 71*a*, 71*b*. In the illustrated example, the unit is duplicated. The units 71*a*, 71*b* each has the same configuration as the communication station 40 shown in FIG. 4. One of the dual units 71*a* and 71*b* serves as an active unit and the other serves as a standby unit. A separate address is assigned to the low-priority communication section of each unit. Each unit is connected to the multiplexed communication path (main path and sub-path).

Assume that the unit 71*a* is active and the unit 71*b* is standby. Another communication station 72 transmitting to the multiplexed communication station 70 performs communications to the active unit 71*a*. When it has failed in communications with the active unit 71*a* on whichever multiplexed communication path, the communication station 72 retries communications to the standby unit 71*b*.

Figure 9:
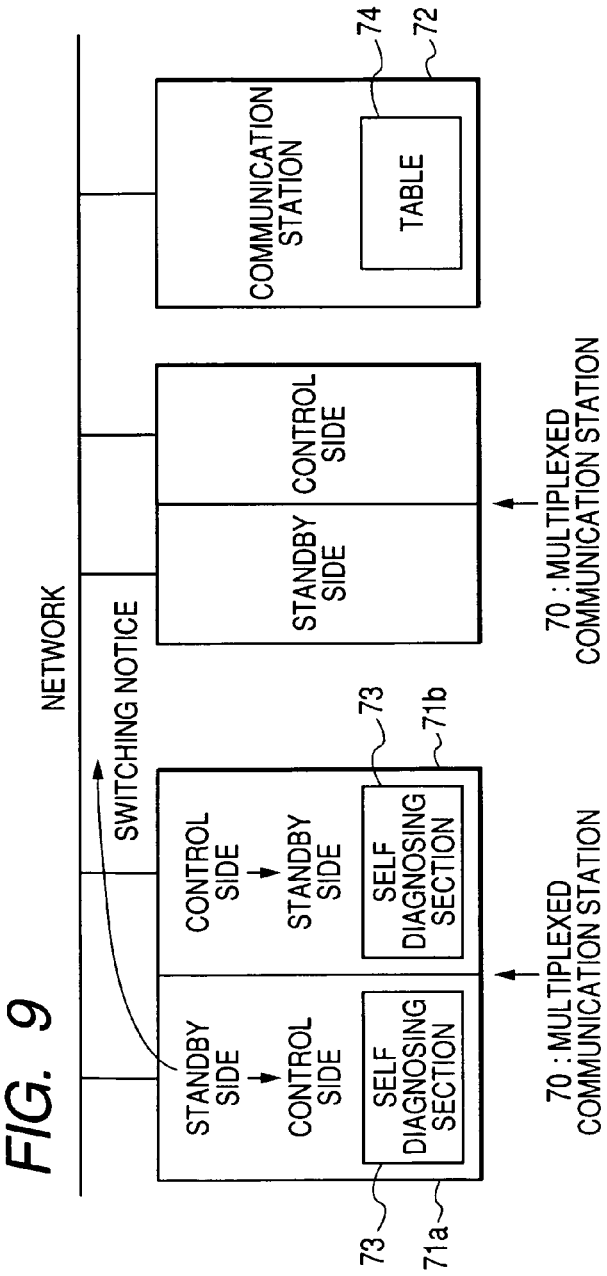
[FIG. 9] It is an explanatory drawing of switching of a control right in the embodiment shown in FIG. 8.

FIG. 9 is an explanatory drawing of switching of a control right in the embodiment shown in FIG. 8.

Each unit 71a, 71b includes self diagnosing section 73.

Assume that the unit 71a is active and the unit 71b is standby.

The self diagnosing section 73 in the active unit 71a, on detecting a fault, places itself in the standby state and halts communications. When the unit 71a has halted communications, the standby unit 71b places itself in the active state and starts communications and broadcasts to the other communication stations that it is now an active unit.

The other communication station 72 includes a table 74 storing information on which unit of the multiplexed communication station 70 is active. The communication station 72 references the information stored in the table 74 to perform transmission to the active unit. On receiving a broadcast from the unit 71b, the communication station 72 updates the information in the table 74.

In the embodiment shown in FIG. 8, a multiplexed communication station assures highly reliable communications.

(7) Seventh Embodiment

Authentication section may be provided in the communication station 40 in FIG. 5. The authentication section performs authentication between high-priority communication section in separate communication stations and enables communications between authenticated communication stations.

Figure 10:
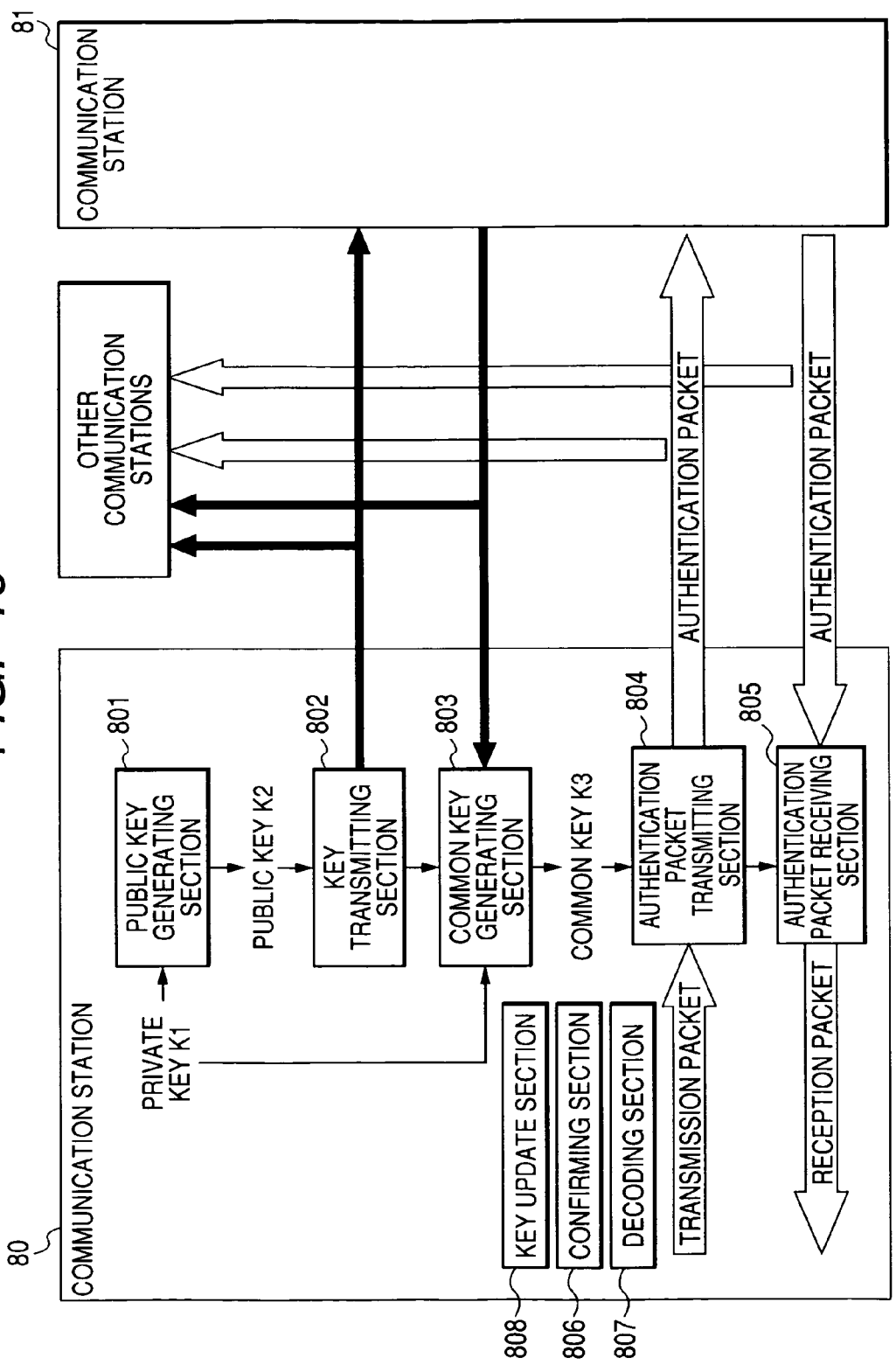
[FIG. 10] It shows a particular configuration example of authentication section.

FIG. 10 shows a particular configuration example of authentication section.

While the configuration of authentication section is shown in FIG. 10 for convenience of explanation, the communication station 80 also includes the components of the communication station 40.

Public key generating section 801 generates an electronic public key K2 to be exchanged between the home station and another communication station from an electronic private key K1 unique to the home station.

Key transmitting section 802 broadcasts the generated public key K2 to all communication stations.

Common key generating section 803 generates, on a per communication station basis, an electronic common key K3 unique to communication stations 80 and 81 from a public key K2' received from the other station 81 and the private key K1 of the home station and stores the generated common key in the communication station 80. The common key generating section 803 uses for example the Differ-Hellman method to generate a common key from a private key and a public key.

Authentication packet transmitting section 804 uses the generated common key K3 to encrypt a packet or appends an authentication value to a packet. The authentication packet transmitting section transmits the encrypted packet or the packet to which the authentication value is attached to another communication station 81.

Authentication packet receiving section 805 decrypts a packet received from the other communication station 81 by using the common key K3 or determines whether reception is allowed based on the common key and the authentication value attached to the packet.

Key update section 808 updates a private key for every predetermined time to update a common key.

Confirming section 806 stores a common key just before update and a latest common key, and confirms an authentication value by using the latest common key on receiving a packet. In case the confirmation is determined illegal, the confirming section 806 confirms the authentication value by using the common key just before update.

Decoding section 807 decodes a packet by using the common key just before update or the latest common key for which the authentication value is confirmed valid.

Figure 11:
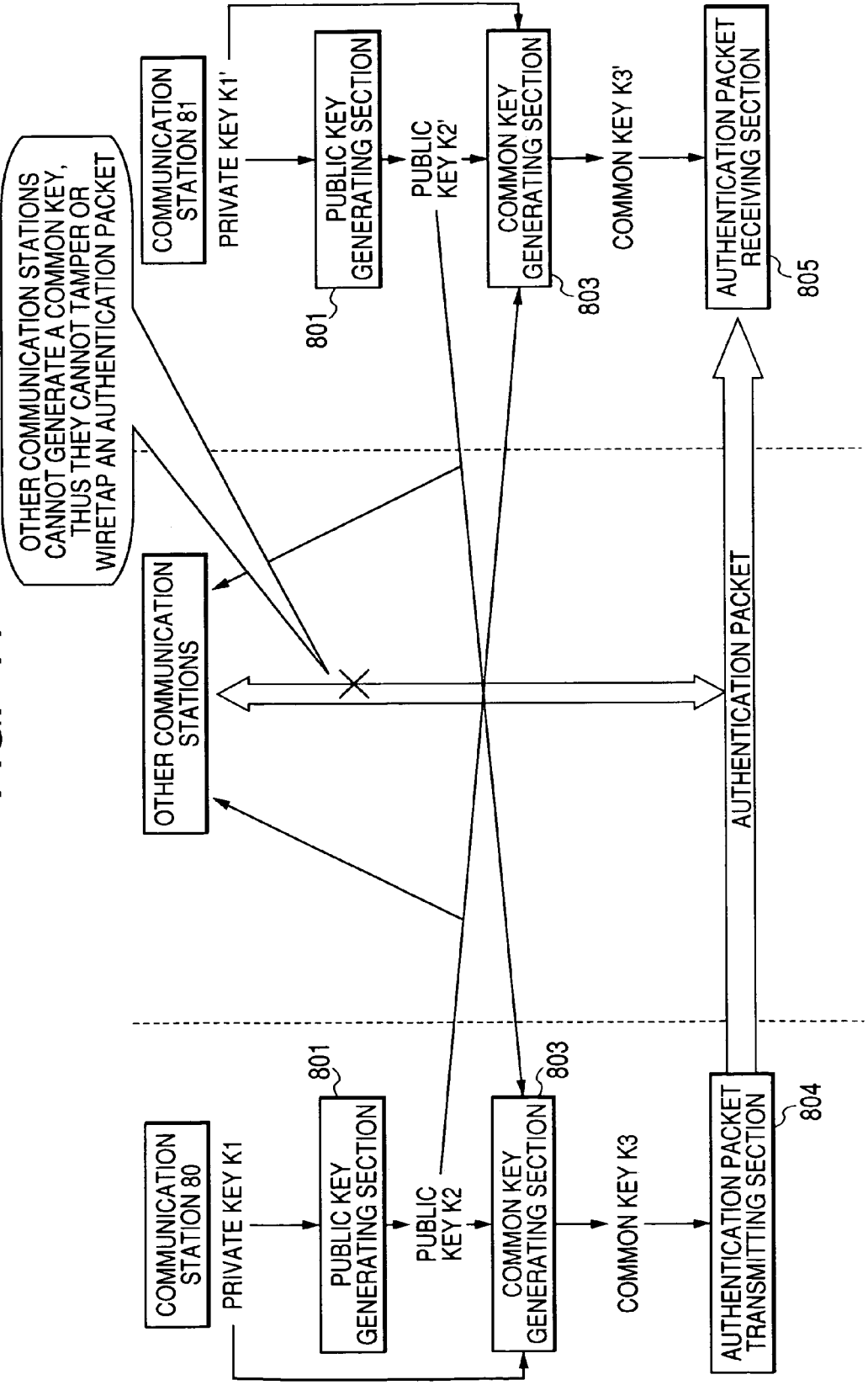
[FIG. 11] It is an explanatory drawing of the operation of the authentication section shown in FIG. 10.

FIG. 11 is an explanatory drawing of the operation of the authentication section shown in FIG. 10.

In a communication station 80, public key generating section 801 generates a public key K2 from the private key K1 of the home station and broadcasts the generated public key K2 to all communication stations.

In a communication station 81 also, the public key generating section 801 generates a public key K2' from the private key K1' of the home station and broadcasts the generated public key to all communication stations.

In the communication station 80, common key generating section 803 generates an electronic common key K3 unique to the communication stations 80 and 81 from the public key K2' received from the communication station 81 and the private key K1 of the home station.

Similarly, in the communication station 81, the common key generating section 803 generates an electronic common key K3' unique to the communication stations 80 and 81 from the public key K2 received from the communication station 80 and the private key K1' of the home station.

In this way, each communication station generates and stores a common key serving as a common password between itself and another communication station.

In the communication station 80, authentication packet transmitting section 804 uses the generated common key K3 to encrypt a packet or adds an authentication value to a packet. The authentication packet transmitting section 804 then transmits the encrypted packet or the packet to which the authentication value is attached to the communication station 81.

In the communication station 81, authentication packet receiving section 805 decrypts a packet received from the communication station 80 by using the common key K3' or determines whether reception is allowed based on the common key K3' and the authentication value attached to the packet.

According to the embodiment shown in FIG. 10, a communication station to which a public key is not transmitted cannot generate a common key so that it cannot wiretap or tamper a transmitted packet. This assures the security of communications. By providing high-priority communications with a common key, it is possible to prevent a security attack in open low-priority communications from having an influence on high-priority communications.

(8) Eighth Embodiment

Figure 12:
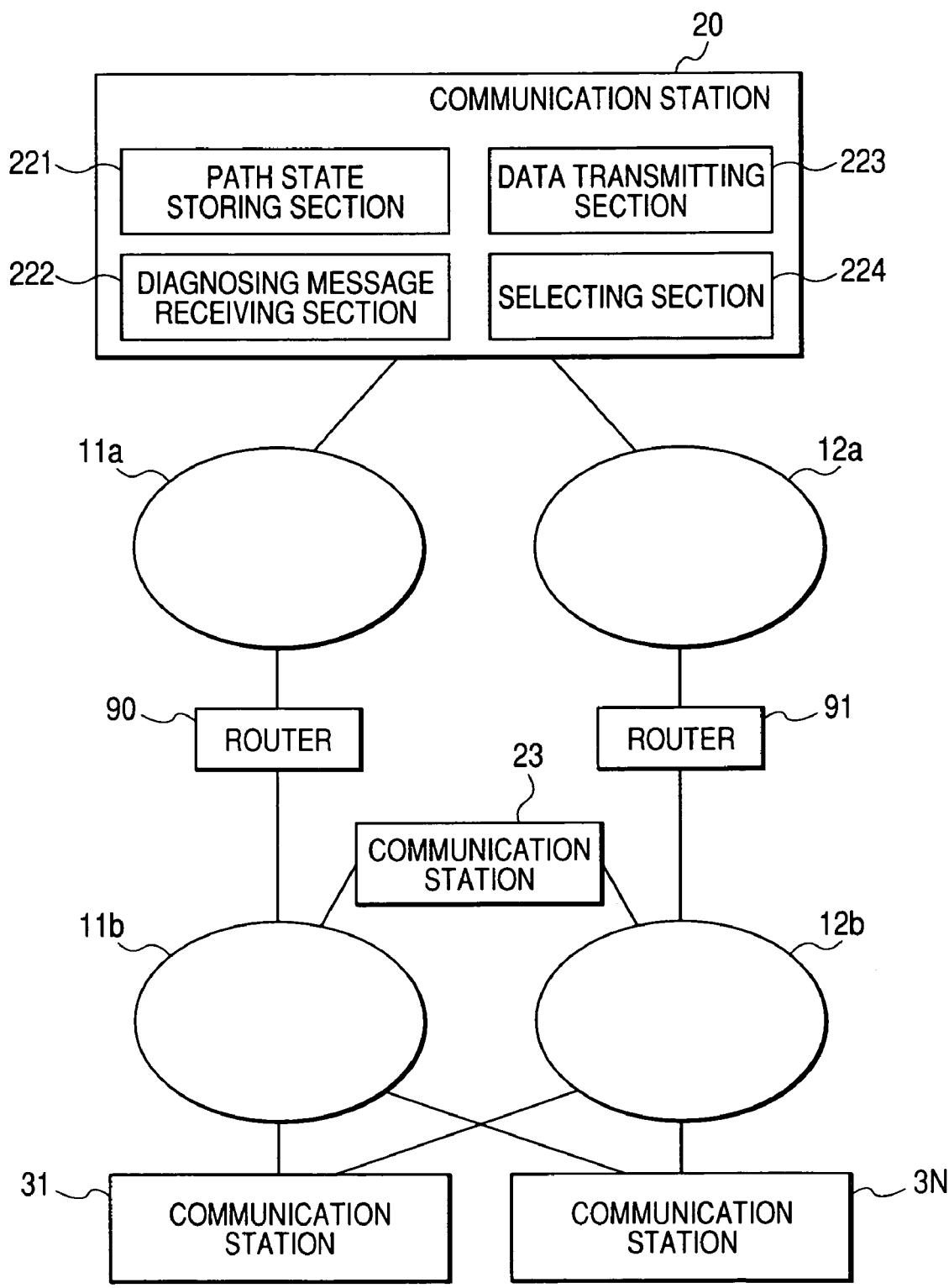
[FIG. 12] It is a block diagram showing another embodiment of the invention.

FIG. 12 is a block diagram showing another embodiment of the invention.

In the embodiment shown in FIG. 12, routers 90, 91 to perform path control of a communication path in accordance with Internet Protocol are provided on a main path and a sub-path respectively. The main path is composed of sub-networks 11a, 11b interconnected by the router 90. The sub-path is composed of sub-networks 12a, 12b interconnected by the router 91.

A sole master station exists on a sub-network. The master station transmits an inter-network diagnosing frame. The inter-network diagnosing frame includes information on the path between the home station and each of the other communication stations present on a sub-network to which the home station belongs and information on the path between the home station and the master station present on a sub-network to which the home station does not belong.

In FIG. 12, the communication station 20 serves as the master station on the sub-network 11a, 12a. The communication station 23 serves as the master station on the sub-network 11b, 12b.

In the communication station 20, path state storing section 221 stores path state information indicating whether the communication path from the home station to another communication station is sound.

Diagnosing message receiving section 222 registers in the path state storing section 221 the path state between the home station and a communication station present on a sub-network to which the home station does not belong based on the path state information included in the inter-network diagnosing frame. In the example shown in Fig. 12, the diagnosing message receiving section 222 registers the path state between the communication station 20 and a communication station on the sub-network 11b, 12b.

Data transmitting section 223 selects either the main path or sub-path in accordance with the information in the path state storing section 221 and transmits data.

The path state storing section 221, the diagnosing message receiving section 222 and data transmitting section 223 are provided in a master station and the other communication stations.

Selecting section 224 prepares a list of the network addresses of all communication stations present on a sub-network and, in case the address of the home station is one uniquely determined from predetermined conditions, causes the home station to operate as the master station on the sub-network. The address uniquely determined refers to, for example, the highest address, the lowest address, and the like.

Figure 13:
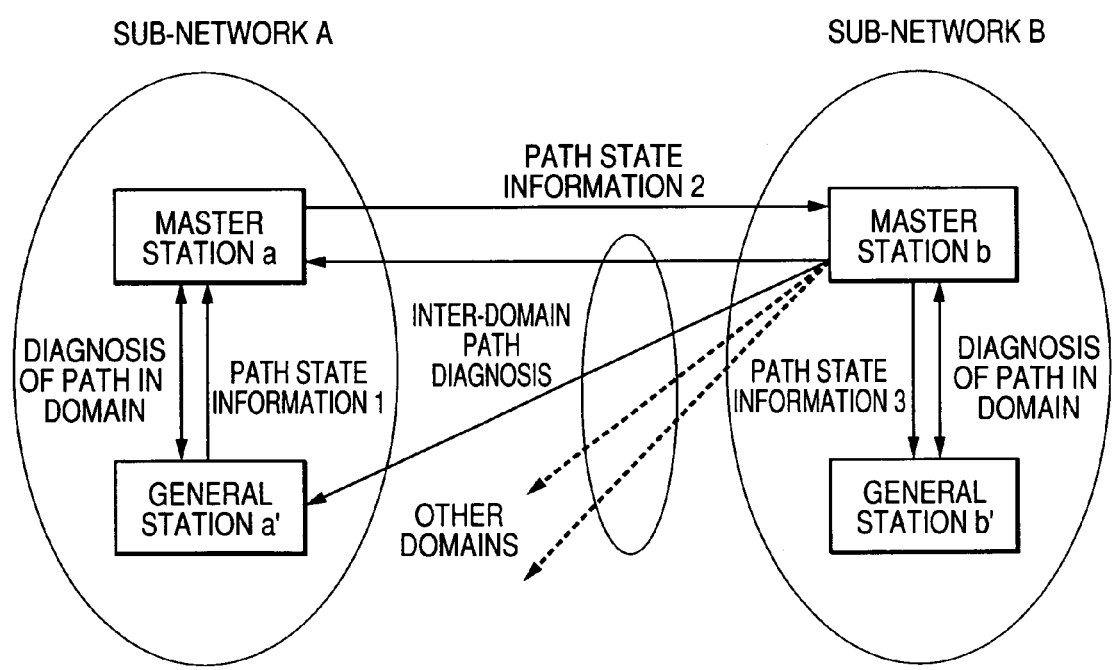
[FIG. 13] It is an explanatory drawing of a procedure whereby a communication station obtains path state information.

FIG. 13 is an explanatory drawing of a procedure whereby a communication station obtains path state information.

In FIG. 13, communication stations other than the master station are called general stations. Sub-networks A and B are interconnected. On the sub-network A, a master station a and a general station a' are interconnected. On the sub-network B, a master station b and a general station b' are interconnected.

In such a network, processing is made in the following procedure:

The general station a' cyclically transmits via multicasting the reception state from each station in the home sub-network to each of the dual paths in the home sub-network.

Each station, having received the reception state, acquires path state information 1 from the home station to the distant station.

The master station in each sub-network cyclically transmits via multicasting the reception state from the master station in another sub-network and the reception state from each station in the home sub-network to each of the dual paths.

Each station, having received the reception state, acquires path state information 2 between the master stations based on the reception state coming from the master station in another sub-network.

Each station acquires path state information 3 to each station in the master station based on the reception state in the source sub-network.

In this way, each communication station can determine the soundness of each of the dual paths from the path state information 1, 2, 3.

The embodiment shown in FIG. 12 provides the following advantages:

(a) Each of the stations can determine the soundness of a path.

(b) A general station and a master station perform multicast transmission to obtain information on a path to the outside of the home sub-network.

(c) In case the path state information of the home station is fault without exception or in case communications are interrupted for a predetermined time, a fault in the home station is assumed thus allowing use for troubleshooting also.

(9) Ninth Embodiment

Figure 14:
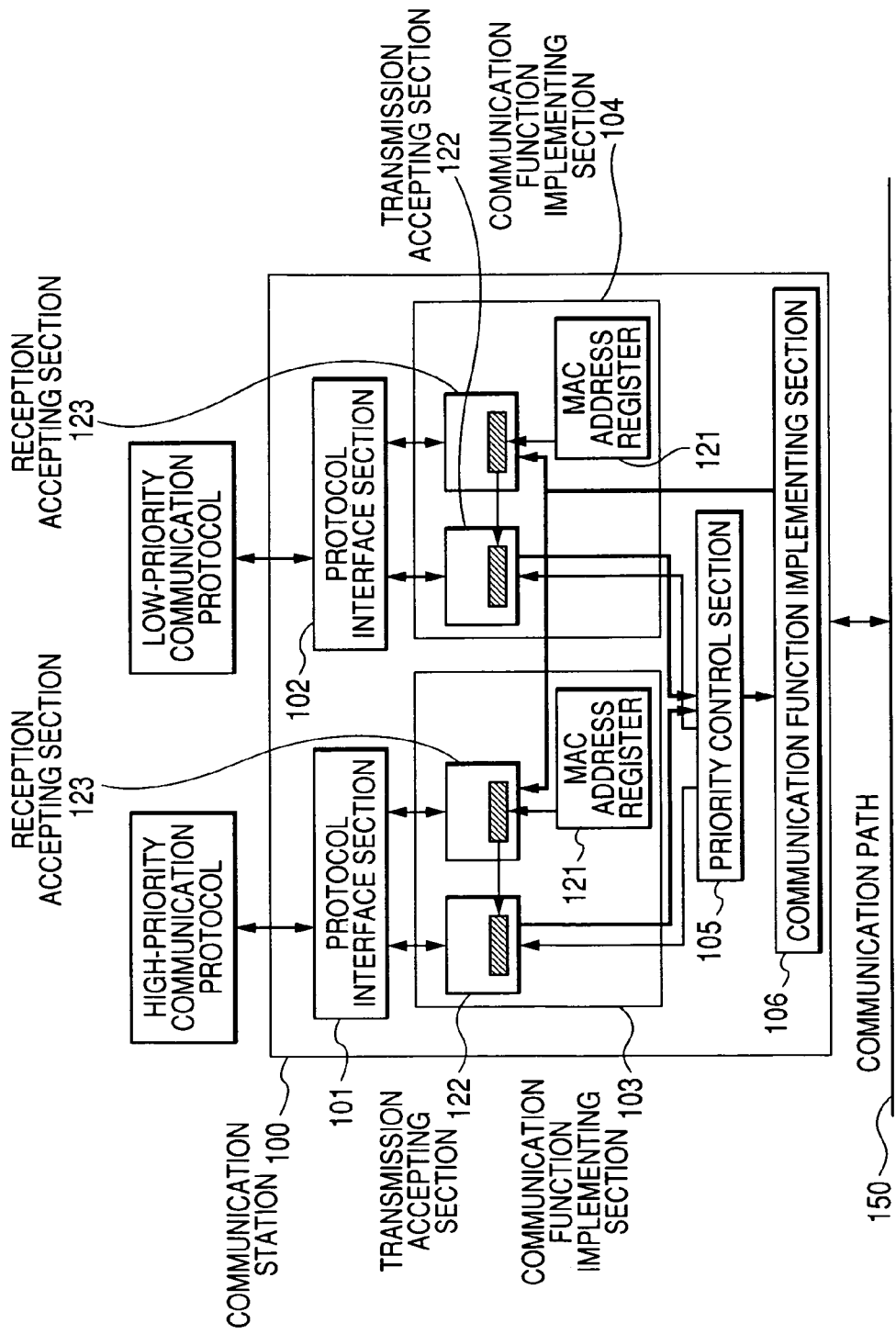
[FIG. 14] It is a block diagram showing another embodiment of the invention.

FIG. 14 is a block diagram showing another embodiment of the invention.

In this embodiment, high-priority communications and low-priority communications share a single communication path.

A communication station 100 includes protocol interface section 101 for performing high-priority communications and protocol interface section 102 for performing low-priority communications.

A higher-rank host computer (not shown) communicates with the protocol interface section 101 in accordance with a high-priority communication protocol and communicates with the protocol interface section 102 in accordance with a low-priority communication protocol.

Communication function implementing section 103 and 104 are provided to correspond to the protocol interface section 101 and 102, respectively. These communication function implementing section 103, 104 implements a communication function in the data link layer (second layer) of an OSI hierarchical model.

Priority control section 105 controls transmission from the communication function implementing section 103, 104 based on the priority of the protocol. The communication function implementing section 103, 104 splits a frame into sub-frames below a certain frame length and transmits the resulting sub-frames to the priority control section 105.

Communication function implementing section 106 implements a communication function in the physical layer (first layer) of an OSI hierarchical model. High-priority communications and low-priority communications share the communication function implementing section 106.

The communication station 100 is connected to the communication path 150. The communication path 150 is shared by low-priority communications and high-priority communications.

In the communication function implementing section 103, a MAC address register 121 stores a MAC address corresponding to a protocol for high-priority communications. Transmission accepting section 122 accepts a frame transmitted by the communication station 100. Reception accepting section 123 accepts a frame received by the communication station 100.

Communication function implementing section 104 has a similar configuration. The MAC address register 121 of the communication function implementing section 104 stores a MAC address corresponding to a protocol for low-priority communications.

Operation of the embodiment show in FIG. 14 will be described.

Figure 15:
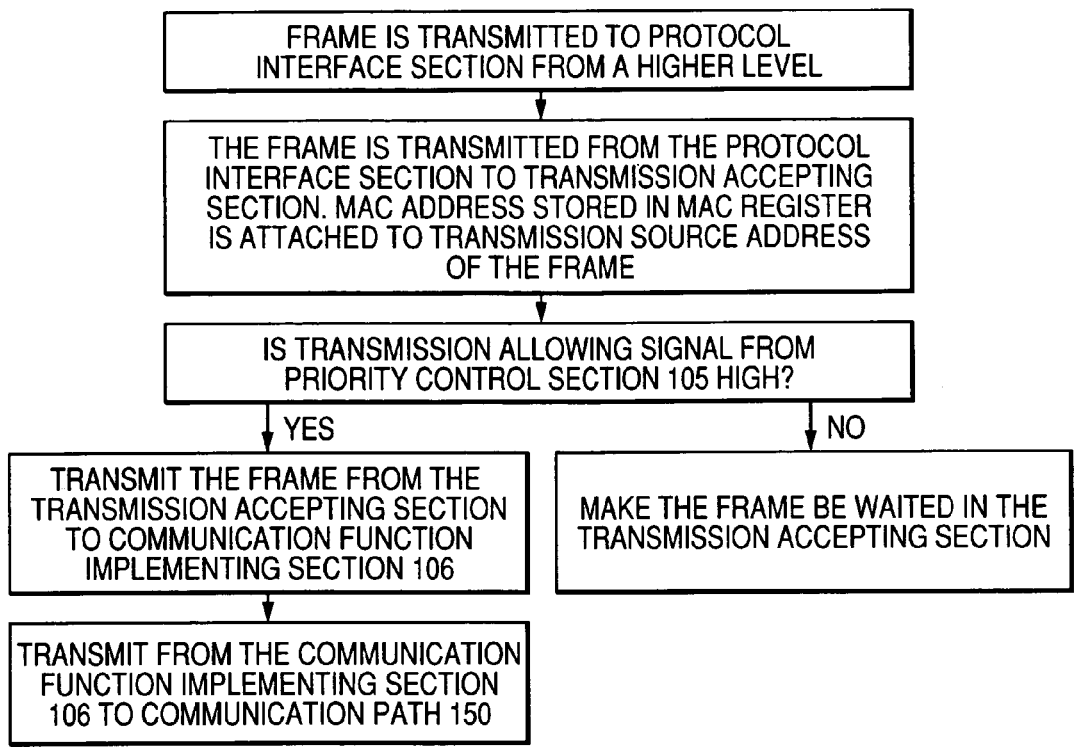
[FIG. 15] It is a flowchart showing a transmission procedure.

FIG. 15 is a flowchart showing a transmission procedure.

In the transmission procedure of high-priority communications, transmission accepting section 122 appends the MAC address of a MAC address register 121 to the source address part of the transmission frame received from protocol interface section 101 and temporarily stores the frame.

In case the transmission allowing signal output from the priority control section 105 is High, the transmission accepting section 122 passes the frame to the priority control section 105, which immediately passes the frame to a communication function implementing section 106. In case the transmission allowing signal output from the priority control section 105 is Low, the transmission accepting section 122 keeps storing the frame and causes the frame to wait until the transmission allowing signal is driven High. The priority control section 105 controls the transmission allowing signal based on the priority assigned to the protocol for high-priority communications.

Transmission processing of low-priority communications is the same as above.

Figure 16:
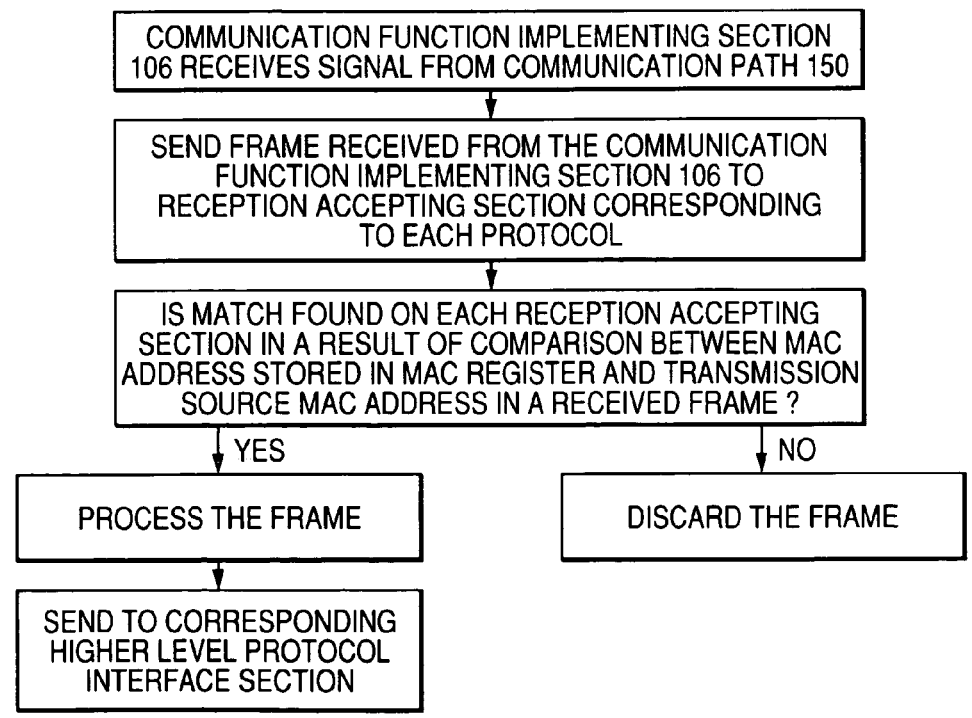
[FIG. 16] It is a flowchart showing a reception procedure.

FIG. 16 is a flowchart showing a reception procedure.

In the reception processing of high-priority communications, reception accepting section 123 compares the destination address of the reception frame received from the communication function implementing section 106 and the MAC address stored in a MAC address register 121. In case a match is not found, the frame is discarded. In case a match is found, the frame is passed to protocol interface section 101.

Reception processing of low-priority communications is the same as above.

The priority control section 105 classifies communications into high-priority protocol communications and low-priority protocol communications. The priority control section 105 always gives a transmission right to the transmission acceptance of a frame of a high-priority protocol unless another frame is being transmitted. The priority control section 105 gives a transmission right to the transmission acceptance of a frame of a low-priority protocol unless another frame is being transmitted and no frames are waiting at the transmission acceptance of a high-priority protocol, and immediately causes the frame to be transmitted.

The priority control section 105 controls transmission of a transmission frame by using the transmission allowing signal so that the transmission count of transmission frames per certain time from the communication function implementing section 103, 104 will drop below a predetermined value assigned to each of the communication function implementing section 103, 104.

According to the embodiment shown in FIG. 14, both a network using an open standard protocol and a network using a unique protocol to implement real time communications are necessary in the communications between hosts, interfaces for these protocols are provided in the same communication station and the protocol processing function share the same communication function implementing section and communication path. This reduces the hardware cost and cable laying cost.

In the above embodiments, a communication station is present in the operation monitoring apparatus in a distributed control system.

While the embodiments employ a duplicated unit, the unit may be triplicated or further being multiplexed.

In the multiplexing of triplication or above, a single main path and a plurality of sub-paths constitute a communication path.

The invention claimed is:

1. A communication control method for controlling communications performed between a plurality of communication stations that are connected to communication paths being multiplexed with a main path and a sub-path, the communication control method comprising:

implementing a first communication function in a physical layer of an OSI hierarchical model;
multiplexing the first communication function so as to correspond with the main path and the sub-path respectively;
implementing a second communication function in a data link layer of the OSI hierarchical model;
multiplexing the second communication function so as to correspond with the multiplexed first communication;
performing a high-priority communication via the first communication function and the second communication function over any one of the multiplexed communication paths; and
performing a low-priority communication via the first communication function and the second communication function over the sub-path,
wherein the high-priority communication and the low-priority communication coexist in a single communication station,
wherein the second communication function includes:
storing MAC addresses corresponding to the high-priority communication and the low-priority communication respectively;
attaching the corresponding MAC address to a communication frame depending on whether a transmission requestor is the high-priority communication or the low-priority communication, and transmitting the communication frame to the communication path; and
comparing a destination MAC address of a communication frame received from the first communication function with the stored MAC address, and when a match is found in the in the comparison result, sending the received communication frame to the corresponding communication function,
wherein a router that performs a path control of the communication path in accordance with Internet Protocol is provided on the communication path, and the communication path includes a plurality of sub-networks being interconnected by the router, and
wherein a sole master station exists on the sub-network,
wherein the master station transmits an inter-network diagnosing frame including path state information on the paths between a home station and all another communication stations existing on the sub-network to which the home station belongs and path state information on the path between the home station and a master station existing on a sub-network to which the home station does not belong, and
wherein said method on each of all communication stations on the plurality of sub-networks including the master station and the other communication stations includes:
storing path state information indicating whether the communication path from the home station to each of the another communication stations is sound;
registering in the stored path state information the path state between the home station and the communication station existing on the sub-network to which the home station does not belong, based on the path state information included in the inter-network diagnosing frame; and
selecting either the main path or the sub-path in accordance with the information in the stored path state information to transmit data.

2. A communication control method for controlling communications performed between a plurality of communication stations that are connected to communication paths being multiplexed with a main path and a sub-path, the communication control method comprising:

performing a high-priority communication normally via the main path;

performing a low-priority communication via the sub-path;

path diagnosing a soundness of the main path and the sub-path; and switching the communication path of the high-priority communication to the sub-path when the main path is diagnosed as faulty as a result of the path diagnosing, wherein the path diagnosing includes:

storing path state information of a path state from a home station to each communication station; and fixed-cycle path diagnosing the communication path from the home station to each communication station in a fixed cycle, wherein the fixed-cycle path diagnosing registers the path state information obtained from a result of the fixed-path diagnosing, in the stored path state information, wherein the fixed-cycle path diagnosing broadcasts a path diagnosis packet in accordance with a multicast protocol of Internet Protocol, wherein different IP multicast addresses are assigned to the main path and the sub-path respectively, wherein each communication station performs broadcasting by using the IP multicast address corresponding to a path selected between the main path and the sub-path, as a destination IP address, and receives a path diagnosis packet of which destination IP address matches with the IP multicast address corresponding to each of the main path and the sub-path, wherein a router that performs a path control of the communication path in accordance with Internet Protocol is provided on the communication path, and the communication path includes a plurality of sub-networks being interconnected by the router, wherein a sole master station exists on the sub-network, wherein the master station transmits an inter-network diagnosing frame including path state information on the paths between a home station and all another communication stations existing on the sub-network to which the home station belongs and path state information on the path between the home station and a master station existing on a sub-network to which the home station does not belong, and wherein said method on each of all communication stations on the plurality of sub-networks including the master station and the other communication stations includes:

storing path state information indicating whether the communication path from the home station to each of another communication stations is sound;

registering in the stored path state information the path state between the home station and the communication station existing on the sub-network to which the home station does not belong, based on the path state information included in the inter-network diagnosing frame; and selecting either the main path or the sub-path in accordance with the information in the stored path state information to transmit data.

3. The communication control method according to claim 1 or 2, further comprising:

generating a list of network addresses of all communication stations existing on the sub-network, and in a case where an address of the home station is the address that is uniquely determined among the list based on a predetermined condition, causing the home station to operate as the master station on the sub-network.

4. The communication control method according to claim 1 or 2, wherein the high-priority communication performs communication in accordance with a protocol dedicated to process control, and the low-priority communication performs communication in accordance with an open standard protocol.

5. The communication control method according to claim 1 or 2, wherein the high-priority communication transfers at least one of process data, an operation amount and an alarm, and the low-priority communication performs at least one of image data transfer, file transfer and message transfer.

* * * * *